Figure 1:
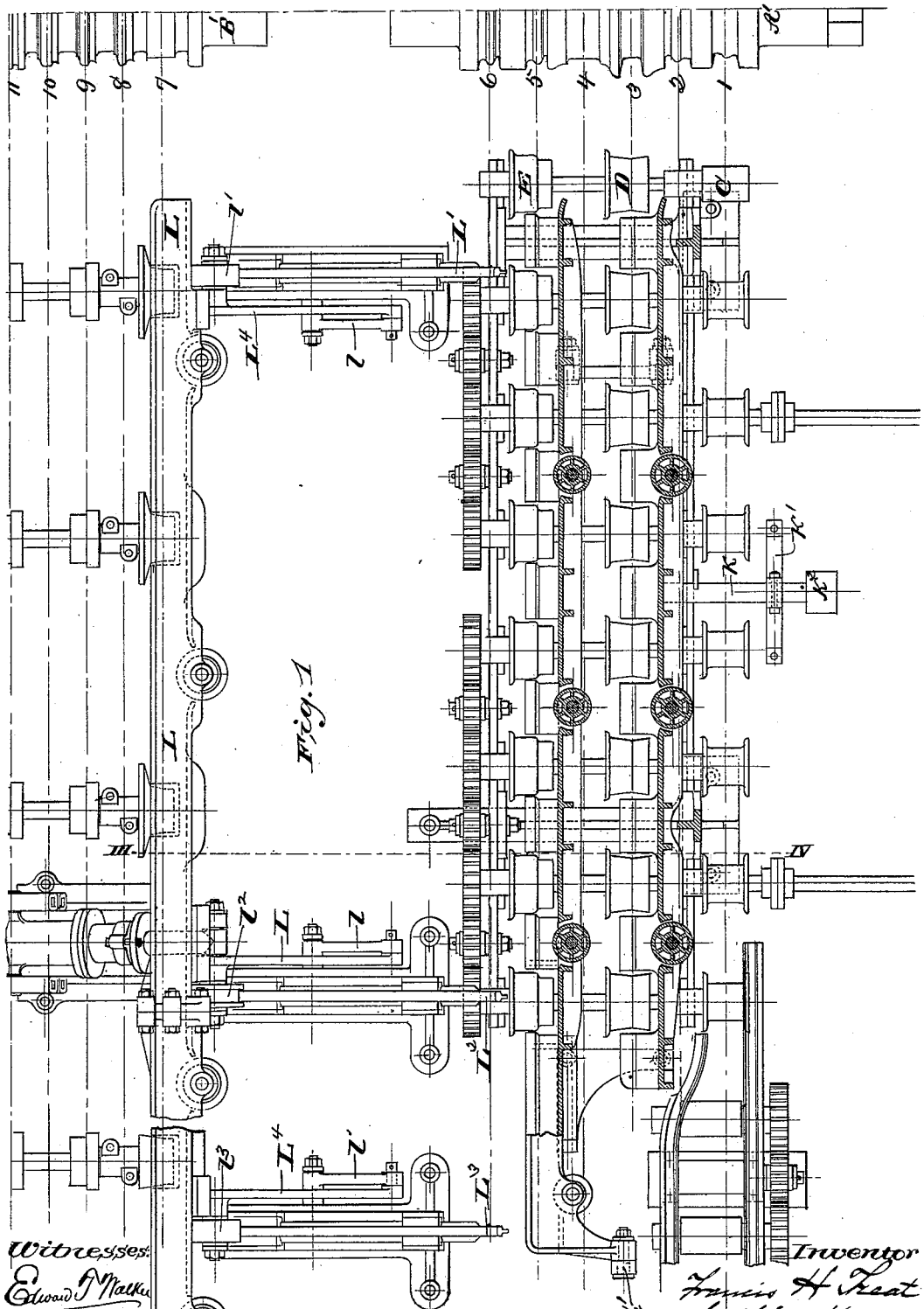

(No Model.)  6 Sheets—Sheet 1.

F. H. TREAT.
ROLLING MILL.

No. 402,784.  Patented May 7, 1889.

(No Model.)

6 Sheets—Sheet 2.

F. H. TREAT.
ROLLING MILL.

No. 402,784.

Patented May 7, 1889.

(No Model.)

6 Sheets—Sheet 3.

F. H. TREAT.
ROLLING MILL.

No. 402,784. Patented May 7, 1889.

Witnesses:
Inventor (No Model.) 6 Sheets—Sheet 4.
F. H. TREAT.
ROLLING MILL.
No. 402,784. Patented May 7, 1889.
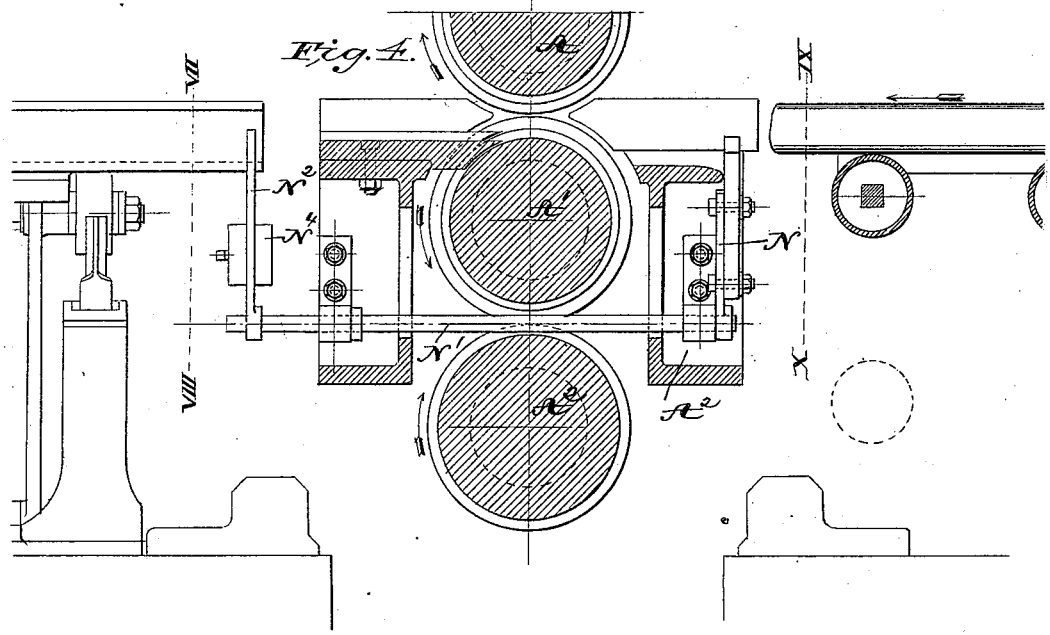
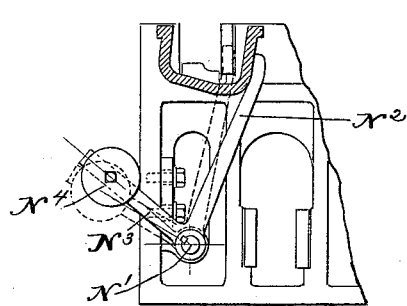
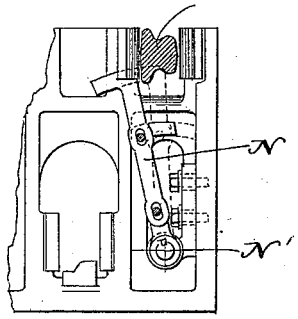

(No Model.) 6 Sheets—Sheet 5.
F. H. TREAT.
ROLLING MILL.
No. 402,784. Patented May 7, 1889.
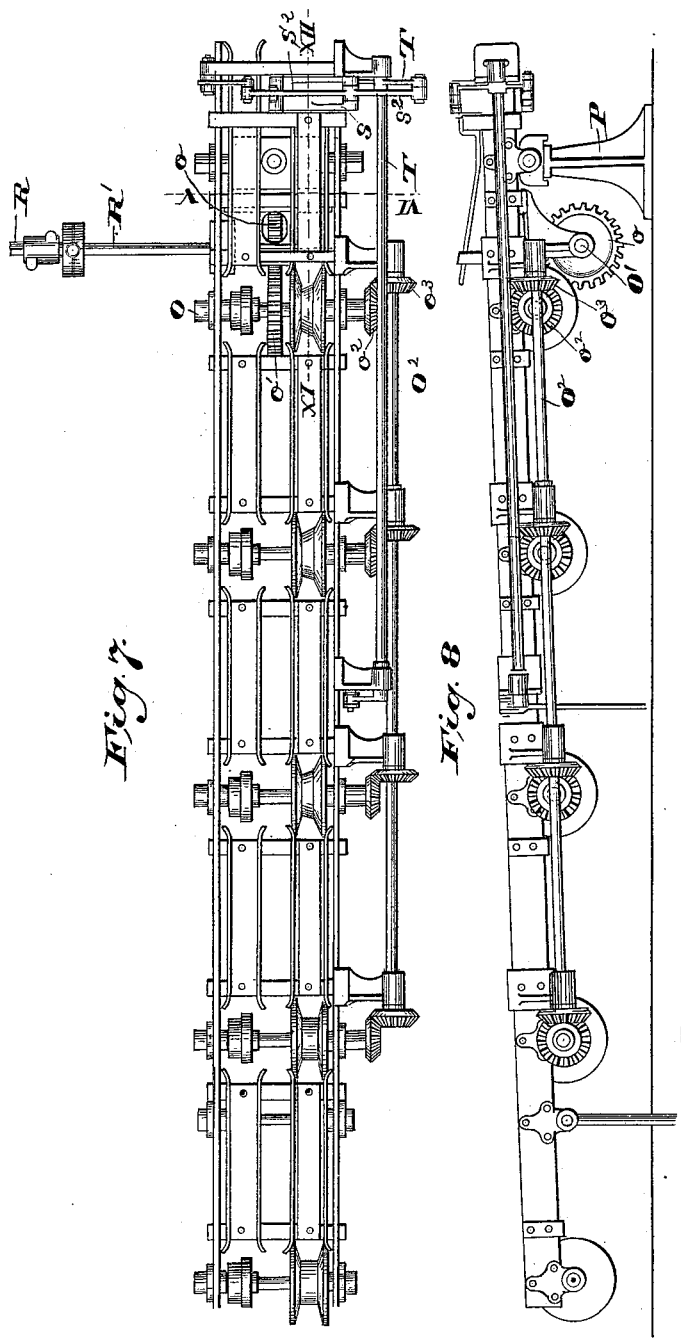
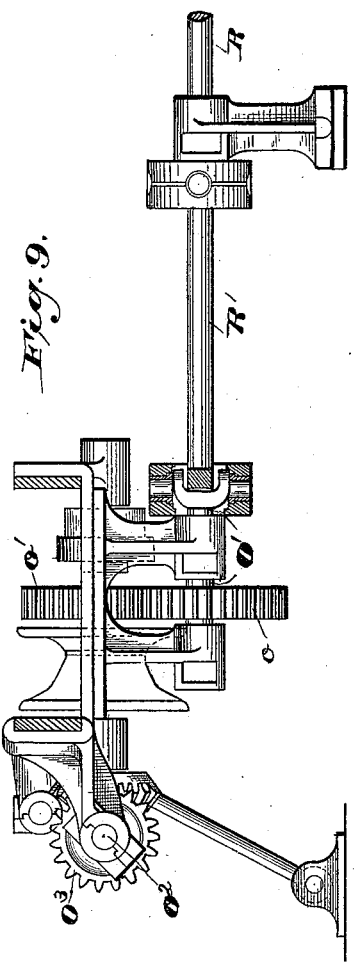
Witnesses:
Edward J. Walters
L. B. Whitaker
Inventor.
Francis H. Treat
By his attys.
Whitaker & Prevost (No Model.) 6 Sheets—Sheet 6.
F. H. TREAT.
ROLLING MILL.
No. 402,784. Patented May 7, 1889.
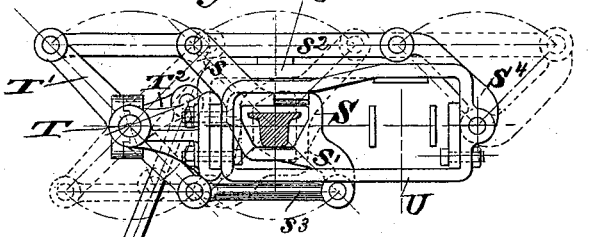
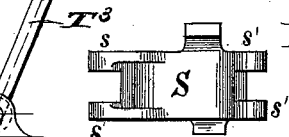
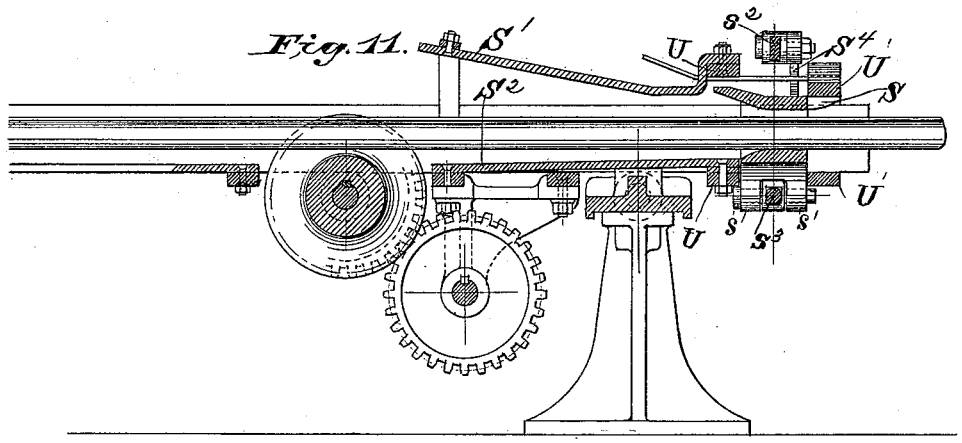
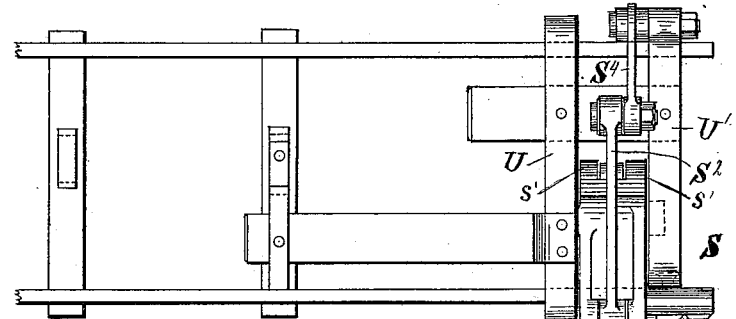
Witnesses:
Edward G. Walker
L. R. Whitaker
Inventor:
Francis H. Treat
by his attorney
Whitaker & Prevost

UNITED STATES PATENT OFFICE.

FRANCIS H. TREAT, OF JOLIET, ILLINOIS, ASSIGNOR OF TWO-THIRDS TO HORACE S. SMITH AND CHARLES PETTIGREW, BOTH OF SAME PLACE.

ROLLING-MILL.

SPECIFICATION forming part of Letters Patent No. 402,784, dated May 7, 1889.

Application filed June 21, 1887. Serial No. 242,082. (No model.)

*To all whom it may concern:*

Be it known that I, FRANCIS H. TREAT, a citizen of the United States, residing at Joliet, in the county of Will and State of Illinois, have invented certain new and useful Improvements in Rolling-Mills; and I do hereby declare the following to be a full, clear, and exact description of the invention, such as will enable others skilled in the art to which it appertains to make and use the same.

This invention relates to a rolling-mill plant such as described in my United States Patent No. 314,083, for automatically converting a bloom into a finished rail.

The principal improvements, briefly enumerated, consist, first, of an automatic safety device for preventing the bloom from entering the first pass of the roughing-rolls unless or until the rear roughing-table is in proper position to receive the piece from said pass; second, of the application of two pivoted troughs and mechanism for simultaneously turning them from their upper to their lower positions, and vice versa; third, of an automatic safety device for preventing the piece from entering the last pass of the roughing-rolls unless or until the trough for transferring the piece to the front finishing-table is in proper position to receive the piece from the said last roughing-pass; fourth, of mechanism for operating the trough for transferring the piece from the front roughing-table to the front finishing-table; fifth, of a device and operating mechanism associated therewith for automatically turning the piece on the first line of feed-rollers on the rear finishing-table; sixth, of gearing for driving the feed-rollers of the rear finishing-table.

The annexed drawings show only so much of my improved rolling-mill plant as is necessary to clearly illustrate the embodiment of the aforesaid improvements. The ensuing description will also be extended so far only as may be necessary to a clear understanding of the construction and operation of my aforesaid improvements.

Figure 2:
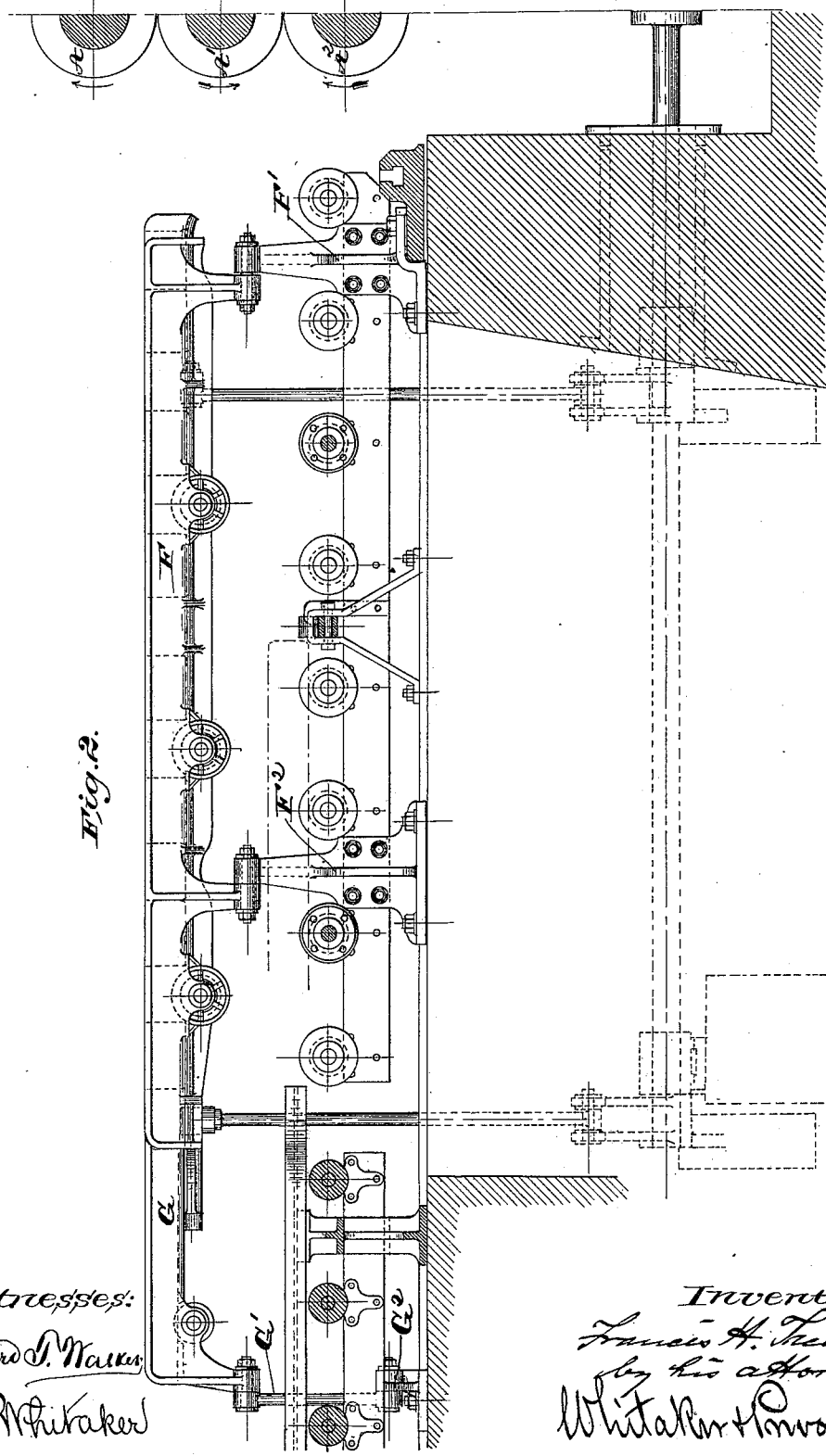
Figure 3:
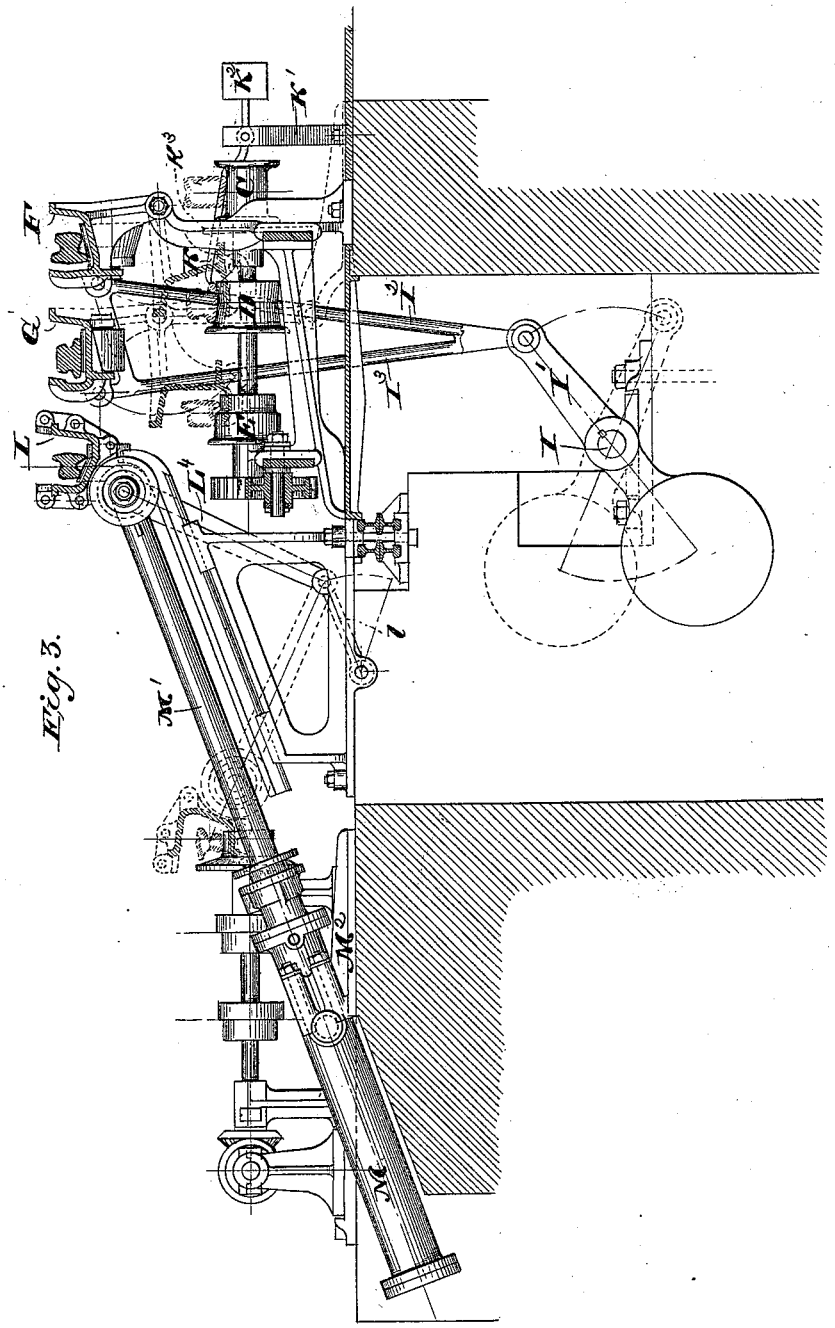

Figure 1 represents a plan view, partly sectional, of the front roughing-table and part of the front finishing-table, one-half of the middle roughing-roll and of the middle finishing-roll being also shown, as well as a portion of the bloom shear-table from which the bloom is delivered onto the first line of feed-rollers of the front roughing-table. Fig. 2 represents a side elevation, partly sectional, of the front roughing-table, the end of the bloom shear-table adjacent thereto, and one-half of the roughing-rolls. Fig. 3 represents a cross-section in the plane indicated by broken line III IV on Fig. 1. Fig. 4 represents a transverse section of the roughing-rolls and guides in the plane of the last roughing-pass, showing the safety device associated with said pass, as well as the adjacent end of the front and rear roughing-tables and transfer-trough. Fig. 5 represents a cross-section in the plane indicated by broken line VII VIII on Fig. 4. Fig. 6 represents a cross-section in the plane indicated by broken line IX X on Fig. 4. Fig. 7 represents a plan view of the rear finishing-table. Fig. 8 represents a side elevation of the rear finishing-table, showing also one-half of the finishing-rolls. Fig. 9 represents a cross-section in the plane indicated by broken line V VI on Fig. 7. Fig. 10 represents the rear end of the rear finishing-table, showing the device and mechanism for turning the piece on the first line of feed-rollers on said table. Fig. 11 represents a longitudinal section in the plane indicated by broken line XI XII on Fig. 7. Fig. 12 is a plan view of the piece-turning socket. Fig. 13 is an enlarged plan view of a portion of the rear finishing-table. Figs. 1, 2, and 3 are drawn to the same scale. Figs. 7 and 8 are drawn to a somewhat smaller scale, and the remaining figures are drawn to a somewhat larger scale.

The same letters of reference indicate identical parts in all the figures.

A A' A² refer to the roughing-rolls, and B B' B² to the finishing-rolls. The roughing-rolls are constructed to form six equally-spaced passes, 1 2 3 4 5 6. The finishing-rolls are constructed substantially like the finishing-rolls of my aforesaid patent, the passes indicated on the drawings being marked, respectively, 7 8 9 10 11. In front of the roughing-rolls, and respectively in line with the three lower roughing-passes, 1, 3, and 5, are three parallel lines of power-driven feed-rollers, (marked, respectively, C, D, and E.) There is also a pair of hinged dumping-troughs, F and G, in front of the roughing-rolls, adapted to receive the billet or piece as it issues from the upper roughing-passes, 2 or 4, and to dump it upon the feed-rollers D or E. The said three lines of feed-rollers and the pair of pivoted troughs constitute the front roughing-table. In rear of the roughing-rolls is a rear roughing-table, (only partially shown on Fig. 4,) differing from the rear roughing-table of my aforesaid patent merely in having one additional line of feed-rollers. The rear roughing-table and the pair of pivoted troughs of the front roughing-table are operated from the same longitudinal rock-shaft, I, and simultaneously, so that the position of the pivoted troughs is an index to the position of the rear roughing-table. I take advantage of this fact in embodying that part of my invention which governs the entrance of the bloom at roughing-pass 1, and simply so apply a fence, K, across the line of feed-roller C that it prevents the feed of the bloom past it until such fence has been forced down out of the way by the trough F on the latter reaching its lowest position, at which time the rear roughing-table also reaches its lowest position, ready to receive the piece issuing from any one of the lower roughing-passes, 1, 3, and 5. In this instance fence K is a pivoted one, being journaled on a stand, K', and having a tail carrying a weight, $K^2$, which throws the fence up as trough F rises. The upward throw of the fence is arrested by a stout fixed hook, $K^3$, which also serves as an abutment for the fence against the strain brought upon it by the feeding of a bloom up against it.

Trough F is hinged by arms of suitable length on stands F' and $F^2$, so that it may be turned from the receiving position it is shown in by full lines in Figs. 2 and 3 to the dumping position it is shown in by full lines in Fig. 1 and by dotted lines in Fig. 2, or vice versa. This trough F receives the piece from the upper roughing-pass, 2, and dumps it upon the feed-rollers D, giving it a quarter-turn in the transfer. Openings in what is the lower side of the trough when it is turned down permit that side to descend below the top of the feed-rollers D, so that the piece will be properly deposited thereupon.

The trough F is turned up and down, as required, by two arms, I', on the rock-shaft I through the medium of two connecting-rods, $I^2$ and $I^3$. The piece is received from the upper roughing-pass, 4, and dumped upon the feed-rollers E, again receiving a quarter-turn in its transfer by trough G, which is similar in construction to trough F, but sufficiently longer to accommodate the considerably-elongated piece. Trough G transfers the piece from in front of an upper roughing-pass to in front of a lower roughing-pass like trough F, so that since the roughing-passes are equally spaced these troughs require to be shifted like distances. In order that trough G may be operated through the medium of the same connecting-rods, $I^2$ and $I^3$, which operate trough F, I hinge trough G at or near its outer end (a point which is beyond the reach of the outer end of the piece while being dumped by trough F) by an arm of suitable length on the upper end of a sway-bar, G', which is pivoted at its lower end to a suitable fixed bearing, $G^2$. The sway-bar provides for the articulation which is required to compensate for the difference in the arcs described by the respective troughs. The connecting-rods have the triangular frame-like form shown in Fig. 3, and connecting-rod $I^3$ has at its upper end a brace extending longitudinally along trough G, so as to afford a long bearing for steadying said trough.

The piece is received from the last upper roughing-pass, 6, by the transfer-trough L, by which it is transferred, receiving a quarter-turn in its transfer to and dumped upon the line of feed-rollers in front of the first lower pass, 7, of the finishing-rolls. The transfer-trough is mounted upon inclined tracks—three in this instance—marked respectively, L' $L^2$ $L^3$, by suitable rollers, $l'$ $l^2$ $l^3$, one of which is flanged to steady the trough in longitudinal directions. At each inclined track the trough is also provided with a rigid downwardly-projecting arm, $L^4$, the extreme lower end of which is pivoted to a link, $l$, which is in turn pivoted on the sleeper of the track. At the center track the transfer-trough is pivoted to the plunger M' of a hydraulic jack or engine, the cylinder M of which is arranged at an inclination corresponding to the inclination of the tracks on which the transfer-trough is supported. Notwithstanding that the jack has the same inclination as the tracks, its cylinder is supported by trunnions on stand $M^2$, in order that it may adjust itself to correct any slight inaccuracy in its position. The arms $L^4$ and links $l$ insure a parallel motion of the transfer-trough as it is moved from one end of its tracks to the other, and also impart a quarter-turn to the trough back and forth, as indicated in Fig. 3, where the two extreme or resting positions of such trough are shown, respectively, by full lines and by dotted lines.

In order that the piece may not be fed from the rear roughing-table into the upper roughing-pass, 6, until or unless the transfer-trough L is in position to receive it, I combine a gate with the inguide to such roughing-pass 6 and the transfer-trough in such a manner that the gate-bars ingress to such inguide unless the tranfer-trough is in proper position to receive the piece. In the example shown the gate is an arm, N, (made of two bars, so as to be extensible,) so fixed to a rock-shaft, N', that its head or upper end can be thrown across the inguide to bar the piece from entering. The rock-shaft N' passes through a blank pass formed between the middle and lower rolls, as shown, and is provided with a fixed upright arm, $N^2$, in position to be struck by the side of the transfer-trough as such trough reaches its position for receiving the piece from roughing-pass 6. Arm N² has an angular tail, N³, carrying a weight, N⁴, which tends to turn the rock-shaft, so as to throw the gate across the inguide into the position it is shown in by dotted lines in Fig. 6. As the transfer-trough comes up to position for receiving the piece from roughing-pass 6, it strikes arm N², turning the rock-shaft so as to turn the gate into the position it is shown in by full lines in Fig. 6, out of the way of the piece. The rock-shaft N' is supported in suitable bearings on the guide-frames, as clearly shown in Fig. 4.

The rear finishing-table, in its general construction and mode of mounting, is like the movable rear finishing-table of my aforesaid patent, differing therefrom in only two respects—namely, first, in respect to the gearing for driving the feed-rollers, and, secondly, in respect to the means for turning the piece after it has emerged from the first lower finishing-pass. The shaft O of the feed-rollers, next to the stand P upon which this rear finishing-table is mounted at or near its outer end, is driven from the main shaft R through the medium of tumbling-rod R', counter-shaft O', and spur-wheels $o$ and $o'$. The tumbling-rod is at one end connected by a universal joint to the main shaft R, which turns in fixed bearings on the foundation, and at the other end by another universal joint to the counter-shaft O', which turns in hangers on the rear finishing-table near the stand P. The rear finishing-table has but little motion at the stand P, so that the counter-shaft, being near said stand, can be easily driven by the tumbling-rod in either position of the table. Shaft O has at one end a bevel-wheel, $o^2$, which drives a bevel-wheel, $o^3$, on the feed-shaft $O^2$, arranged in bracket-arms longitudinally along the side of this rear finishing-table to drive, by suitable bevel-gearing, the shafts of the other feed-rollers. The outer end of the piece received from the lower finishing-pass, 7, passes through the socket S, which receives a quarter-turn and turns the piece over on its side during the transport to the line of the upper finishing-pass, 8. The socket is suspended by its arm $s$ from the suspension-bar $s^2$, one end of which is supported by a rocker, $S^4$, pivoted on the rear finishing-table, while the other end is connected to one arm of a cross-bar, T', of a shaft, T, the other arm of which cross-bar is connected by a link, $s^3$, to arm $s'$ of socket S. Shaft T is journaled in bracket-arms on the rear finishing-table, and extends along the same to a point (about half-way in this instance) where the table has so much motion in being shifted from the lower to the upper finishing-passes, or vice versa, that the coupling-rod $T^3$, pivoted at one end to a fixed stand on the foundation and at the other end to an arm, $T^2$, at the end of shaft T farthest removed from the socket, will turn shaft T sufficiently to give a quarter-turn to the socket.

The full lines of Fig. 10 illustrate the positions of the parts when the rear finishing-table is in line with the lower finishing-passes, while the dotted lines of said figure illustrate the positions of the parts when the rear finishing-table is in line with the upper finishing-passes, the foundation being shown as shifted instead of the table, for the sake of clearness of illustration.

Transversely of the rear finishing-table are placed two frames, U U', of slightly-different form, at a distance apart, forming a slot entirely across the table. These frames are rigidly secured to the frame of the table, and the piece-turning socket is suspended between them. The main body of the socket and its arms $s$ and $s'$ are of such width that the socket can be easily moved from one position to another upon its supports. The arm $s$, whatever position the socket may occupy, always extends between and above the upper bars of the frames U U', and the arm $s'$ always extends between and below the lower bars of the said frames. The socket can therefore have little or no movement lengthwise of the table, as any such movement brings these arms in contact with the frames U U'. These frames therefore serve as buttresses for the socket and relieve its supporting devices from all lateral strain as the piece enters and passes through the socket.

The end of the piece-turning socket facing the finishing-rolls is made flaring, so that the piece may readily enter it. Diverging top and bottom guard-plates, S' and S², are also arranged in front of the socket, to prevent the end of the piece from turning up or down and to guide it properly into the socket, and the frames U U' are so constructed that these guard-plates do not come in contact therewith in turning the piece.

The details of construction and association of parts may be greatly varied without departing from the principle of my invention, each subdivision thereof being enumerated by the claims.

I claim as my invention—

1. The combination, substantially as before set forth, of the rear roughing-table and a movable fence across the line of feed-rollers in front of the first roughing-pass.

2. The combination, substantially as before set forth, of the rear roughing-table, a movable fence across the line of feed-rollers in front of the first roughing-pass, and the dumping-trough on the front roughing-table for moving the fence out of the way of the bloom.

3. The combination, substantially as before set forth, with the first hinged dumping-trough on the front roughing-table and the rock-shaft, arms, and connecting-rods for operating said trough, of a second dumping-trough hinged at its outer end to a sway-bar and pivoted to said connecting-rods.

4. The combination, substantially as before set forth, of the transfer-trough and a movable gate across the inguide of the last roughing-pass.

5. The combination, substantially as before set forth, of the gate across the inguide of the last roughing-pass, the rock-shaft which carries said gate, a weighted arm on said rock-shaft, and the transfer-trough.

6. The combination, substantially as before set forth, of the transfer-trough supported on tracks and the arms and links which effect its parallel motion and quarter-turning in being moved from one end of its track to the other.

7. The combination, substantially as before set forth, of the transfer-trough supported on tracks, a trunnioned hydraulic jack for moving it, and the arms and links which effect its parallel motion and quarter-turning in being moved from one end of its track to the other.

8. The combination, substantially as before set forth, of the main shaft, the rear finishing-table, the counter-shaft supported on said table near the stand to which the table is connected by a universal joint, and the tumbling-rod for transmitting motion from said main shaft to said counter-shaft.

9. The combination, substantially as before set forth, with the first line of feed-rollers of the rear finishing-table, of the piece-turning socket and link-connections suspending said socket and giving it a quarter-turn in shifting the table from the lower to the upper finishing-passes, or vice versa.

10. The combination, substantially as before set forth, of the piece-turning socket on the rear finishing-table, the elongated rock-shaft for turning the socket, the suspension-bar from which the socket is suspended, and which is supported at one end by a rocker on the rear finishing-table and connected at its other end to one arm of a cross-bar on said rock-shaft, the link for connecting the other arm of the said cross-bar with the socket, and the coupling-rod pivoted at one end to an arm on the said rock-shaft and at the other end to a stand on the foundation.

11. The piece-turning socket suspended between buttresses, which sustain it against the chafing action of the piece, substantially as before set forth.

12. The combination, substantially as before set forth, of the piece-turning socket and the diverging guard-plates for guiding the end of the piece into the socket.

13. The combination, with three-high finishing-rolls, of a rising and falling feed-table at one side of the same, said feed-table being hinged and swiveled at its outer end, a device for shifting the inner end of the feed-table, and a device for turning the rail simultaneously with the rising of the feed-table, substantially as described.

In testimony whereof I affix my signature in presence of two witnesses.

FRANCIS H. TREAT.

Witnesses:
F. A. JACKSON,
F. L. PACKARD.